T. STEVENTON.
DIES FOR MOLDING PHONOGRAPH RECORDS AND THE LIKE.
APPLICATION FILED AUG. 3, 1920.
1,399,817.
Patented Dec. 13, 1921.
4 SHEETS—SHEET 1.
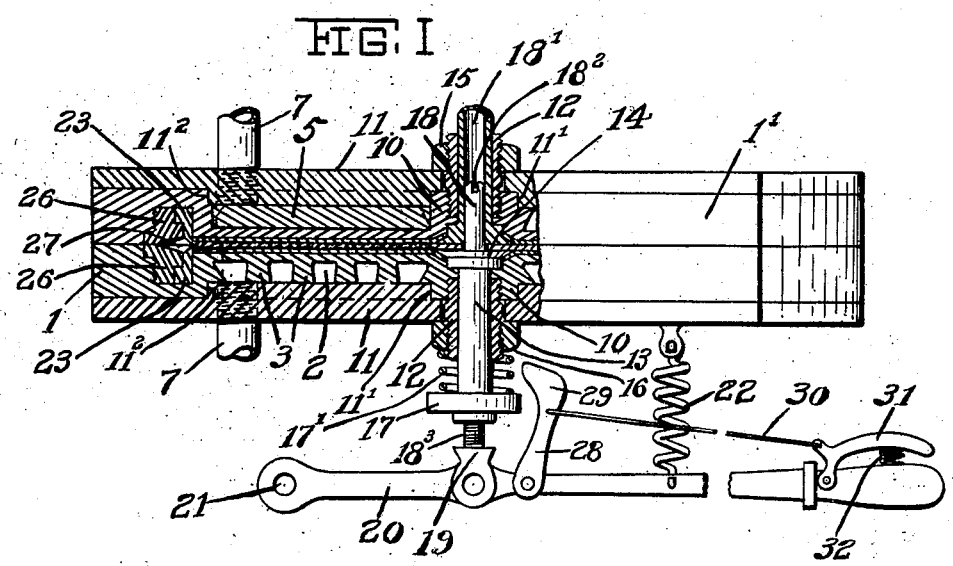
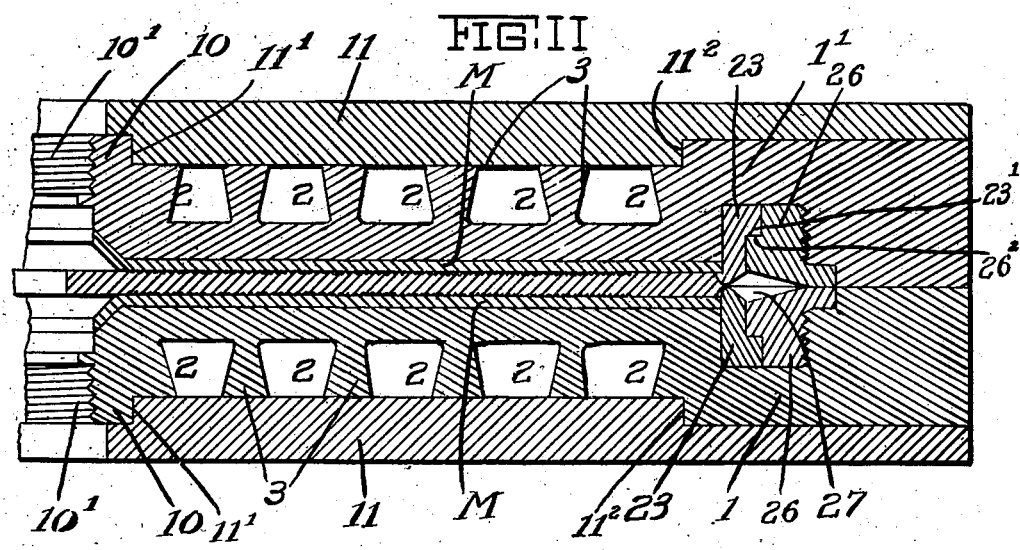
Inventor
Thomas Steventon
By Ellis Spear
Attorney T. STEVENTON.
DIES FOR MOLDING PHONOGRAPH RECORDS AND THE LIKE.
APPLICATION FILED AUG. 3, 1920.
1,399,817.
Patented Dec. 13, 1921.
4 SHEETS—SHEET 2.
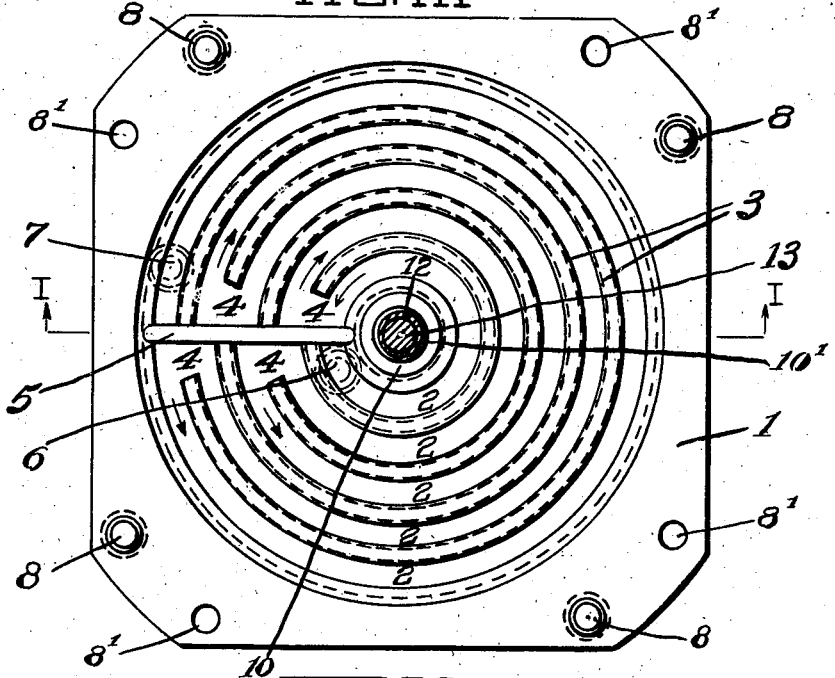
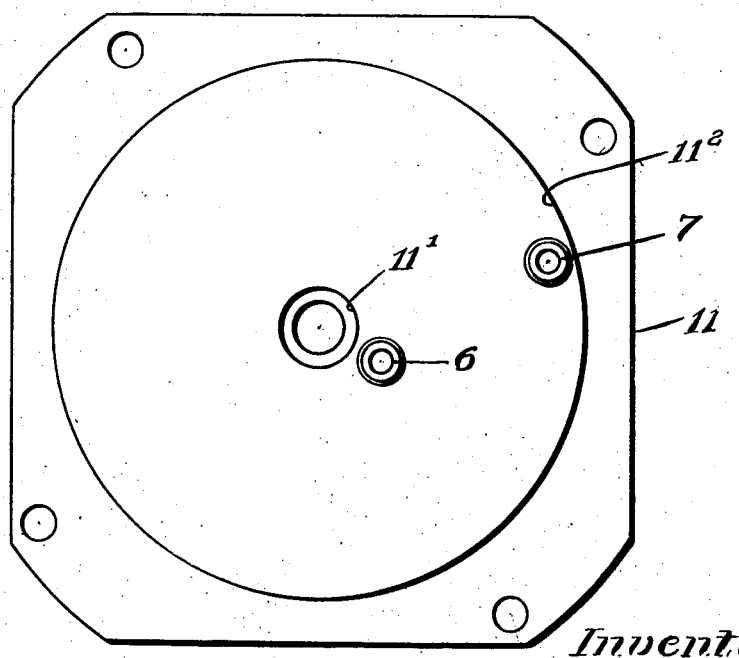
Inventor
Thomas Steventon
By Ellis Spear Jr.
Attorney T. STEVENTON.
DIES FOR MOLDING PHONOGRAPH RECORDS AND THE LIKE.
APPLICATION FILED AUG. 3, 1920.
1,399,817.
Patented Dec. 13, 1921.
4 SHEETS—SHEET 3.
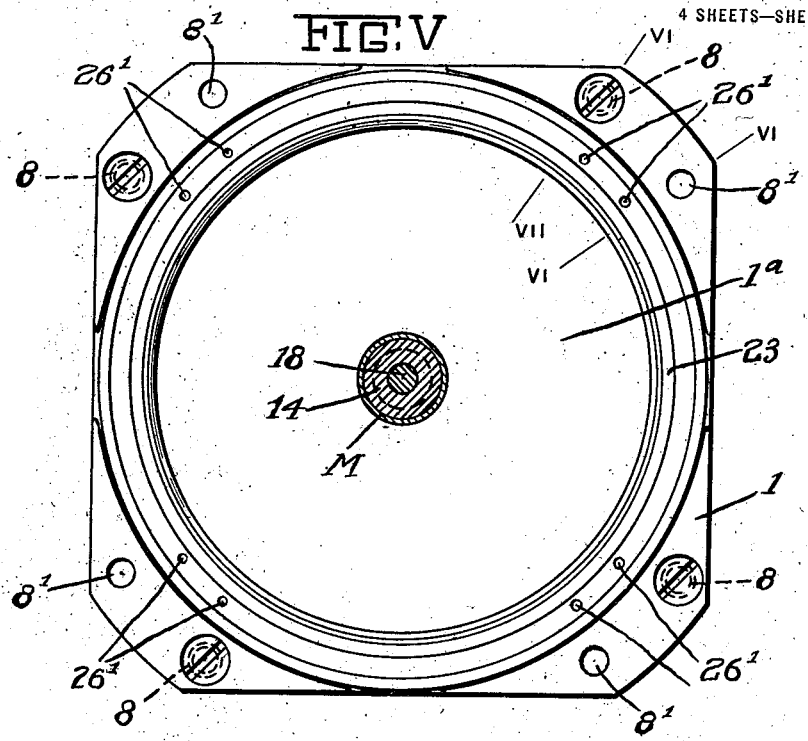
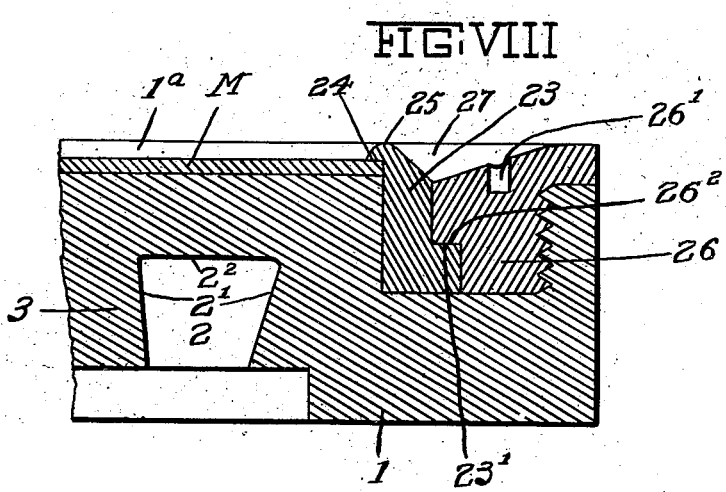
Inventor
Thomas Steventon
By Ellis Spear Jr.
Attorney

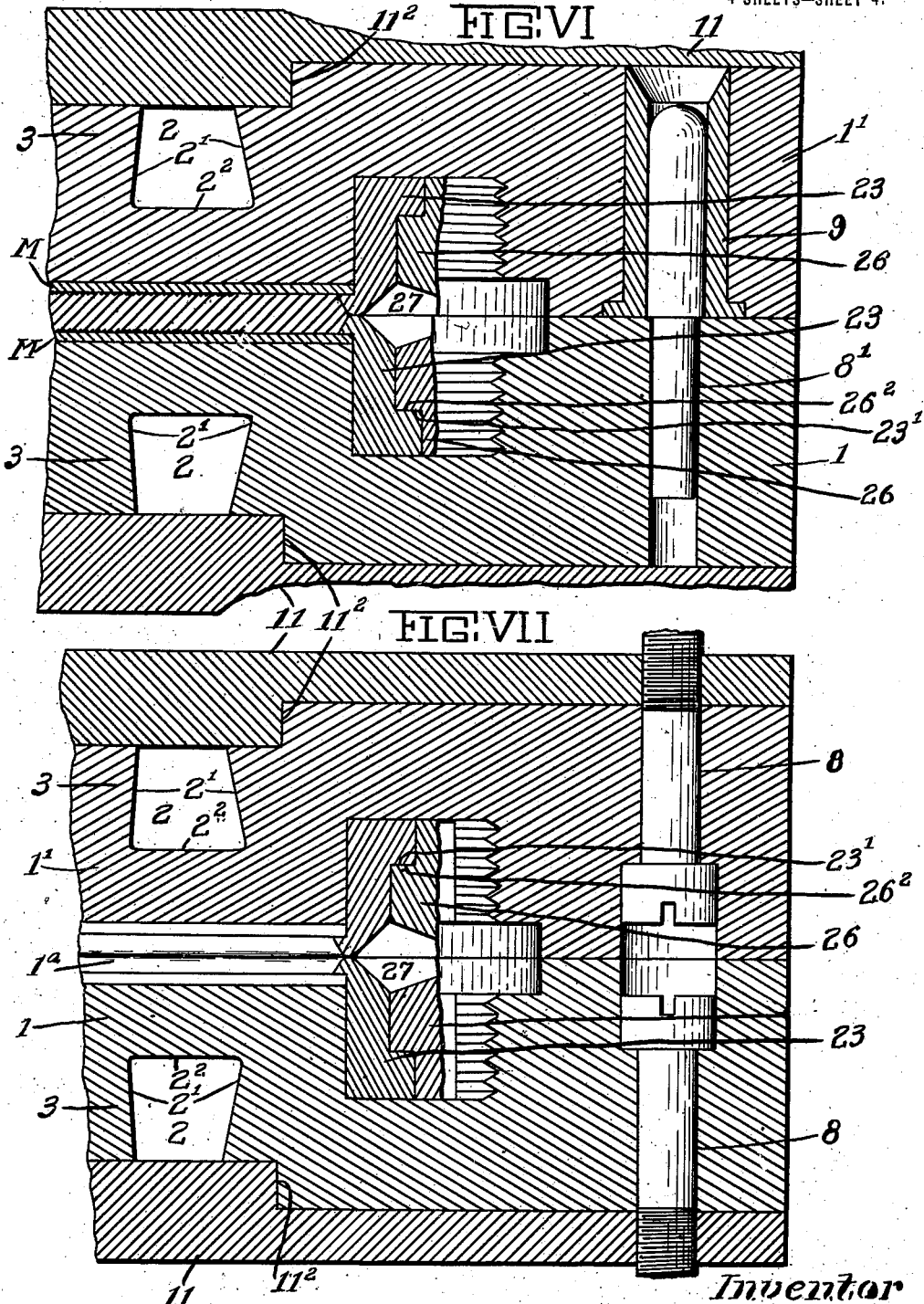

UNITED STATES PATENT OFFICE.

THOMAS STEVENTON, OF FRAMINGHAM, MASSACHUSETTS.

DIES FOR MOLDING PHONOGRAPH-RECORDS AND THE LIKE.

1,399,817.   Specification of Letters Patent.   Patented Dec. 13, 1921.

Application filed August 3, 1920. Serial No. 401,045.

*To all whom it may concern:*

Be it known that I, THOMAS STEVENTON, a citizen of the United States, residing at Framingham, county of Middlesex, and Commonwealth of Massachusetts, have invented certain new and useful Improvements in Dies for Molding Phonograph-Records and the Like, of which the following is a specification.

My present invention relates to press apparatus for forming phonograph records and the like and particularly to the matrix dies or press plates between which the records are molded.

In the operation of these dies the speed of production is very largely influenced and determined by the rate of thermal shift between the heating and cooling steps in the molding.

In my present invention I provide for the heating and cooling by a system of alternating flow in the currents of steam and water by which the thermal shift is accomplished with greater rapidity and more even distribution than heretofore has been possible.

As will appear hereinafter this alternation in the course of the current about the die gives a more even symmetrical progression of the thermal change across the die and the molded record, with a considerable increase in rate of production and a considerable improvement both in product and in avoidance of waste.

My invention furthermore includes certain improvements in details of die structure effective for greater accuracy and ease in operation and giving greater durability and ease in change of parts subjected to wear.

As illustrative of my invention as setting forth such detailed improvements, I have shown in the accompanying drawings a structure which I have found well adapted to practical use. Throughout the specification and drawings like reference characters are employed to indicate corresponding parts and in the drawings:

Figure I is a side view partly in section of a pair of dies.

Fig. II an enlarged section through the die pair.

Fig. III is a view of one of the dies with cover removed.

Fig. IV a bottom view of a cover plate for the same.

Fig. V is a face view of a die.

Fig. VI a sectional view through the guiding dowel of the die pair adjacent the edge.

Fig. VII a similar view through a retaining bolt, and

Fig. VIII a similar enlarged view through the ring.

In the practice of my invention I form the body of the die or press plate by channeling a generally rectangular plate 1 with a series of annular groovings 2 which are preferably undercut as indicated at 2′ so as to increase their bottoms $2^2$ to give an increased radiating surface for the steam and water used in the alternate heating and cooling of the die. Each succeeding groove 2 toward the outside is of slightly greater width than the groove next within it. This permits a more rapid discharge of the steam or the water, when the change is made from one to the other, since the increased channel area enables the die to clear itself with less friction and in less time. This increases the rate of flow and the rapidity of thermal transfer.

This leaves between the channel 2 the undercut ribs 3 which are concentric. These ribs are cut out at short sections as indicated at 4 in staggered relation to each other and across these cut out portions I place a bar 5 preferably of brass which thus seals up the ribs in alternate pairs.

The channels 2 therefore connect regularly so that starting at the point of intake 6 with flow of either water or steam the current alternates at a little less than a complete circumferential transit of the plate. This reversal is caused by the impact of the current against the wall 5 which turns it back into the next outer channel through which it flows in a direction reverse to that in which it originally traveled. This reversal takes place at the end of each channel circuit, the flow being carried off through the exhaust pipe 7.

The upper and lower plates 1 and 1′ are substantially identical, but differ slightly in their equipment. As is seen in Figs. III and VI, the plate 1 is provided with four bolt holes 8. These bolt holes permit the secure fastening of the die to the head of the hydraulic press. The plate 1′ is also provided with bolt holes 8 for the same purpose. In the plate 1 in positions adjacent these bolt holes are set dowels 8′ as shown more clearly in Fig. VI. The plate 1' has openings alined with these dowels which are bushed at 9 to receive the dowel. The top of the bushing is beveled to provide clearance and prevent choking.

The plates 1 and 1' are both provided adjacent their centers with short hubs 10. The plates 1 and 1' are also fitted with cover plates 11 which are shouldered at 11' and 11² so as to fit down and cover the channels 2 making them thus closed channels, through which the steam and water may circulate. The cover plates 11 are each provided with an intake 6 and an outlet 7 for admission of steam and water. The hub 10 is tapped at 10' and into it is screwed a nipple 12. This nipple 12 acts as a guide for the ejector 13 which has an enlarged head 14 and serves to break the vacuum in case a molded record sticks in the die. The nipple 12 screwed into the hub 10 also isolates the ejector stem and molding pin so that these parts are free to move without any danger of leakage thus doing away with the need of stuffing boxes or packing. A nut 15 overlies the cover plate 11 and holds it tightly in place and prevents any leakage. The hollow stem 18' of the ejector extends down through the bushing 12 in the lower die and is provided at its lower end with a nut 16. Between the nut 16 and the nut 17 is a spring 17' intended to hold the ejector back in place at all times. Through the hollow ejector stem 18' passes a molding pin 18 having screw driver slot 18² in its end and at its lower end 18³ this pin is threaded and is detachably and removably screwed into a boss 19 on a lever 20. The lever is pivoted at 21 to any convenient portion of the die or machine and is normally held up by a spring 22 which in the drawing is shown as attached to the cover plate 11.

Pivoted on the lever 20 is a pawl 28 having a flattened head 29. The pawl is operated by a connecting rod 30 to the short arm of a finger clamp 31 normally held away from the handle by a spring 32. The head 29 is shown in retracted position, in which position it clears the nut 17 on the stem 13. In operation when the pin 18 is withdrawn by the depression of the lever and its desire to break the vacuum by lifting on the head 14, the pawl 28 is allowed to slip under the nut 17 while the lever is depressed so that a very slight upward movement of the lever raises the head 14 and clears the molded record from the matrix.

Referring to Fig. V it will be seen that the face of the die 1 consists of a central circular portion 1ᵃ on which the matrix M is supported. The matrix is held in place by a clamping ring 23 shown in Figs. II and VIII. The clamping ring 23 has an inturned portion 24 overlying the matrix M at its margin, thus holding it securely in place. Just above this overlying portion this ring is formed with an annular edge 25 which in cooperation with the corresponding edge of the opposed ring forms the line of severance of the record. The ring 23 is held in place by a locking ring 26. Both of these rings fit into an annular groove surrounding the matrix supporting portion 1ᵃ. The ring 26 is threaded into this portion preferably with an interrupted thread or bridge block joint as is indicated in Figs. VI and VII. The ring 26 is provided at suitable intervals with pairs of spanner holes 26'. The matrix clamp is shouldered at 23' and the ring 26 has an overlying shoulder 26². The upper faces of the rings 23 and 26 are beveled toward each other leaving a space 27 which forms a catch basin or cavity within which any overflow of the molding material will lodge.

In operation the plates 1 and 1' are bolted to the opposed heads of the hydraulic press. The matrices are locked in place by the rings 23 and held by the locking rings 26, the record material is spread on the die and the press operated. Previous to applying the material, steam has been admitted to the intake pipe 6 and the dies brought to the proper temperature. Steam in entering the dies traverses it in a series of alternating circuits which pass progressively out from the center, each turn through the channel effecting its thermal change gradually and uniformly. As soon as the dies have closed and the record formed the steam is cut off and water admitted through the intake 6. The flow of the cold water through the die follows up the steam and passes out through the outlet pipes 7. The dies are then separate, and the lever 20 depressed, withdrawing the pin 18. If, as occasionally happens, the record adheres to the matrix, the lever 20 is slightly raised lifting the head 14 sufficiently to break the vacuum and permit the record to be removed as before described.

Various modifications may obviously be made in the equipment as shown with regard to the various features of the invention herein involved. These features may be embodied jointly but some of them might be employed to advantage separately. The individual features may furthermore be changed in form all without departing from the spirit of my invention if within the limits of the appended claims.

What I therefore claim and desire to secure by Letters Patent is:

1. In a die of the class described having a plurality of concentric channels, a radial wall passing through said channels, alternate channel walls on each side of said radial wall being opened adjacent thereto to permit a reversing circumferential flow through said die.

2. In a die of the class described a channeled plate having a plurality of concentric channels, a radial wall passing through said channels, alternate channel walls on each side of said radial wall being opened adjacent thereto to permit a reversing circumferential flow through said die, and a cover for said plate having intake and outlet.

3. A die for molding phonograph records having an intake and an outlet and having a fluid channel between said intake and outlet, said channel being formed to alternately reverse the flow circumferentially of the plate.

4. In a die of the class described comprising a channeled pressure plate and a cover for said plate having an intake and outlet for flow therethrough, said channel walls being undercut adjacent the radiating face to increase the area of fluid contact in said channel adjacent said face.

5. In a die of the class described a channeled pressure plate having an intake and outlet for flow therethrough, said channel walls being undercut adjacent the radiating face to increase the area of fluid contact in said channel adjacent said face.

6. In a die of the class described a matrix supporting surface, an annular channel surrounding said surface, a shouldered matrix clamp lodged in said channel and having an overhanging clamping lip and a locking ring lodged in said recess to hold said clamp in place.

7. In a die of the class described a matrix supporting surface, an annular channel surrounding said surface, a shouldered matrix clamp lodged in said channel and having an overhanging clamping lip and a locking ring lodged in said recess and having an interrupted threaded engagement therewith to hold said clamp in place.

8. In a die for forming records, a matrix bearing surface, a pin axially movable through said surface, a sleeve surrounding said pin and having an ejector normally lying in said surface, and means operable in one direction for withdrawing the pin and in the other direction for raising said ejector.

9. In a die for forming records, a matrix bearing surface, a detachable molding pin axially movable through said surface, and an operating device for said pin and detachably receiving said pin.

10. In a die for forming records, a matrix bearing surface, a molding pin having a slotted head and axially movable through said surface, an operating lever for said pin, and a threaded connection between said pin and lever.

11. A press die for molding phonograph records having an intake and an outlet and having a plurality of concentric fluid channels of less than circumferential length between said intake and outlet, said channels being radially connected each to the next outer to alternately reverse the flow circumferentially of the plate at predetermined intervals.

12. In a device of the class described a channeled plate, a hub centrally thereof, a cover sealing said channels for a fluidway, an externally threaded hollow nipple screwed in said hub, a fastening threaded on said nipple and seating said cover on said channeled plate and axially movable mold elements guided in said hollow nipple.

13. In a device of the class described a channeled plate, a hub extension thereof, a cover sealing said channels for a fluidway, and leaving an opening receiving said extension, a fastening thread on said extension and seating said cover on said channeled plate and axially movable mold elements guided in said hollow nipple.

14. In a device of the class described a channeled plate, a hollow hub member centrally thereof, a cover sealing said channels for a fluidway and having a central opening receiving said hub member and axially movable mold elements guided in said hollow nipple.

15. In a die of the class described having a plurality of concentric communicating channels, each succeeding channel nearer the outside being of greater cross section than that next inside it.

16. In a die of the class described having an intake and an outlet, a fluid channel therethrough said channel being of increased cross section from intake to outlet.

17. In a die of the class described having an intake and an outlet and a connecting fluid channel therethrough, said channel being baffled at predetermined points in its course and enlarged beyond each baffle point in the direction of flow.

18. In a die of the class described, a matrix, a matrix clamp and a lock for said clamp, there being a space between said clamp and lock within which any overflow molding material may lodge.

19. In a die of the class described, a matrix, a matrix clamping ring, and a lock ring for said clamping ring, there being a space between said rings within which any overflow molding material may lodge.

20. In a die of the class described, a matrix, a shouldered matrix clamping ring and a shouldered locking ring for said clamping ring, adjacent faces of said rings being beveled toward each other to form a space between said rings within which any overflow molding material may lodge.

In testimony whereof I affix my signature in presence of two witnesses.

THOMAS STEVENTON.

Witnesses:
  GEO. B. RAWLINGS,
  MARION F. WEISS.